Patented Dec. 3, 1935

2,022,673

UNITED STATES PATENT OFFICE 2,022,673

COMPOSITION OF MATTER CONTAINING FERTILIZER MATERIALS, ITS PREPARATION AND USE

Walter H. Kniskern, Prince George County, Va., and Charles K. Lawrence, Syracuse, N. Y., assignors to Atmospheric Nitrogen Corporation, New York, N. Y., a corporation of New York No Drawing. Application January 21, 1933, Serial No. 652,922

17 Claims. (Cl. 71—9)

This invention relates to new compositions of matter comprising urea, ammonia and one or more solid fertilizer materials other than the urea, particularly salts of strong inorganic acids. Examples of such solid fertilizer materials are ammonium sulfate, ammonium nitrate, sodium nitrate, potassium nitrate, potassium chloride, and ammonium chloride. This invention further relates to processes for the preparation of the aforesaid compositions, to methods for the transportation of urea, ammonia and said solid fertilizer materials and to the production of fertilizers containing urea and ammoniacal nitrogen. This invention likewise relates to methods of preparing liquid compositions containing relatively high proportions of said solid fertilizer materials, urea and ammonia.

The methods for the fixation of atmospheric nitrogen recently developed make available from this source large amounts of ammonia for industrial purposes and particularly for the production of fertilizers. In the ammonia synthesis process for the production of fixed nitrogen in which hydrogen is obtained from water gas or similar gases containing compounds of carbon large amounts of carbon dioxide are separated from the gas as a by-product in the preparation of the hydrogen-nitrogen gas mixture required for the synthesis of ammonia. This carbon dioxide may be utilized by combining it with the ammonia to form urea. The synthetic ammonia may likewise be oxidized to nitrogen oxides and these oxides absorbed in basic materials such as sodium carbonate, sodium hydroxide, potassium carbonate, potassium hydroxide or ammonium hydroxide to produce the corresponding nitrate salts. The ammonia may likewise be reacted with acids such as nitric acid, hydrochloric acid or sulfuric acid, to form the corresponding ammonium salts. There is, therefore, available at synthetic ammonia plants ammonia, urea, ammonium salts and nitrate salts.

The marketing of these separate products is, however, attended by difficulties and expensive operations. The ammonia may be obtained either in the form of liquid ammonia or of aqua ammonia. The liquid ammonia has relatively high vapor pressures at ordinary temperatures and the aqua ammonia contains a considerable proportion of water, both of which factors make the transportation of large quantities of ammonia difficult and expensive. With respect to the ammonium salts, the nitrate salts and the urea, these materials are produced in aqueous solution and, in order to obtain them as solids expensive evaporations must then be carried on.

It is frequently desirable to prepare a fertilizer containing both phosphorus and nitrogen and this may be done by treating monocalcium acid phosphate materials, such as superphosphate or triple superphosphate, with ammonia. When relatively large proportions of ammonia are added to a superphosphate material, however, the ammonia tends to cause water soluble and citrate soluble $P_2O_5$ in the superphosphate to revert to a citrate insoluble form which is not considered available as plant food. It is often desirable, however, to obtain a fertilizer product containing a higher proportion of nitrogen than may be obtained by treating a superphosphate material with ammonia alone in an amount which does not cause excessive reversion of $P_2O_5$.

It is, accordingly, an object of this invention to provide compositions of matter comprising the nitrogen-containing products readily available at synthetic ammonia plants, which compositions may be conveniently transported as liquids of low vapor pressure containing a relatively high percentage of nitrogen. It is further an object of this invention to provide a process for the economical preparation for transportation of urea, ammonia and fertilizer materials which of themselves are normally in the solid state such as sodium or potassium nitrate, ammonium chloride, ammonium nitrate, urea, ammonium sulfate, etc., in the form of liquid compositions containing these valuable ingredients. Another object of the invention is to provide a process for the production of fertilizers which may contain a relatively high proportion of nitrogen by treating a monocalcium acid phosphate material, for example, superphosphate, triple superphosphate or mixtures containing the same, with a liquid composition comprising urea, ammonia and one or more solid fertilizer materials which are soluble in an ammoniacal liquid.

We have discovered that the solubility of urea in ammoniacal liquids may be modified by dissolving ammonium sulfate in the liquid. Thus, we have found that whereas solutions of urea in about 30% aqua ammonia saturated at 2.5° C. contain about 1.65 parts of urea for every 1 part of ammonia in the solution, if ammonium sulfate is added to such a saturated urea-ammonia-water solution additional urea may be dissolved so that a solution containing about 2.74 parts of urea and about 1.33 parts of ammonium sulfate for every 1 part of ammonia which does not salt out at temperatures above about 2.5° C. may be prepared. Similarly, whereas a solution of urea in about 50% aqua ammonia saturated at −3° C. contains about 1.09 parts of urea for every 1 part of ammonia, if ammonium sulfate is added to the urea-ammonia-water solution, a solution containing about 1.84 parts of urea and about 0.69 parts of ammonium sulfate for every 1 part of ammonia which does not salt out at temperatures above about −3° C. may be prepared.

We have found that the same phenomenon holds true for anhydrous liquid ammonia as for aqua ammonia. Thus, a solution of urea in anhydrous liquid ammonia saturated at 0° C. contains about 0.49 parts of urea for every 1 part of ammonia. If to this urea-ammonia-water solution ammonium sulfate is added, the solubility of the urea is increased so that a solution of urea and ammonium sulfate in liquid anhydrous ammonia may be prepared containing about 0.69 parts of urea and about 0.07 parts of ammonium sulfate for every 1 part of ammonia which solution does not salt out at temperatures above about 0° C. Again, a solution of urea in anhydrous liquid ammonia saturated at 17° C. contains about 0.85 parts of urea for every 1 part of ammonia. By dissolving ammonium sulfate in such a saturated solution the solubility of the urea may be increased so that a solution of urea and ammonium sulfate in anhydrous liquid ammonia may be prepared containing about 1.57 parts of urea and about 0.57 parts of ammonium sulfate which does not salt out at temperatures above about 17° C.

It has been found that solutions containing urea, ammonium sulfate and ammonia may be prepared which will salt out with increases in temperature. For example, a composition containing 39.2% urea, 5.9% ammonium sulfate and 54.9% ammonia contains undissolved solid material at 0° C. which is completely dissolved when the mixture is warmed to 17.3° C. but, if the solution is further warmed to 36.9° C., a solid phase salts out which appears to be different in composition from the solid phase present at 0° C. None of the other compositions of urea, ammonium sulfate and ammonia described in this specification, however, have been observed to show this behavior at temperatures up to about 40° C.

Employing ammonium chloride with urea, we have discovered that the ammonium chloride increases the solubility of the urea in anhydrous liquid ammonia so that a solution containing 1.3 parts of urea and 0.73 part of ammonium chloride for every 1 part of ammonia may be prepared which does not salt out at temperatures above about 0° C., whereas, as stated above, a solution of urea in liquid ammonia saturated at 0° C. contains 0.49 parts of urea for every 1 part of ammonia. A solution of urea in 50% aqua ammonia saturated at 4° C. contains about 1.27 parts of urea for every 1 part of ammonia. By dissolving ammonium chloride in such a solution, we have discovered that the solubility of the urea is increased so that a solution of urea and ammonium chloride in 50% aqua ammonia may be prepared containing about 1.9 parts of urea and about 1.02 parts of ammonium chloride which solution does not salt out at temperatures above about 4° C.

Not only does the presence of the ammonium sulfate and ammonium chloride increase the solubility of the urea but we have discovered that the converse relationship holds true; i. e., that by dissolving urea in solutions of ammonium sulfate or ammonium chloride in ammoniacal liquors the solubility of these salts may be increased.

Thus, for example, a solution of ammonium sulfate in about 30% aqua ammonia saturated at 2.5° C. contains about 0.28 part of ammonium sulfate for every 1 part of ammonia. As pointed out above, by dissolving urea in the ammonium sulfate-ammonia-water solution, a liquid composition containing about 2.74 parts of urea and about 1.33 parts of ammonium sulfate for every 1 part of ammonia, which does not salt out at temperatures above about 2.5° C., may be prepared. The solubility of ammonium sulfate in concentrated aqua ammonia and in anhydrous liquid ammonia is very small. Thus, 0.04 parts of ammonium sulfate do not dissolve in an amount of 50% aqua ammonia containing 1 part of ammonia at 30° C. or below and 0.005 parts of ammonium sulfate do not dissolve in 1 part of anhydrous liquid ammonia at 30° C. or below. On the other hand, a solution of urea and ammonium sulfate in 50% aqua ammonia may be prepared containing 1.05 parts of urea and 0.46 parts of ammonium sulfate for every 1 part of ammonia which does not salt out at temperatures about about 0° C. and, as pointed out above, a solution of urea and ammonium sulfate in 50% aqua ammonia containing about 1.84 parts of urea and about 0.69 parts of ammonium sulfate may be prepared which solution does not salt out at temperatures above about −3° C. Furthermore, as pointed out above, a solution of about 1.57 parts of urea and about 0.57 parts of ammonium sulfate in about 1 part of anhydrous liquid ammonia may be prepared which solution does not salt out at temperatures above about 17° C.

Similarly, whereas a solution of ammonium chloride in anhydrous liquid ammonia saturated at −4° C. contains about 0.54 parts of ammonium chloride for every 1 part of ammonia, a solution in anhydrous liquid ammonia may be prepared containing about 1.1 parts of ammonium chloride and about 0.59 parts of urea which does not salt out at temperatures above about −4° C. Again, a solution of ammonium chloride in 50% aqua ammonia saturated at −2° C. contains about 0.89 parts of ammonium chloride for every 1 part of ammonia, whereas a solution in 50% aqua ammonia may be prepared containing about 1.03 parts of ammonium chloride and about 0.57 parts of urea which solution does not salt out at temperatures above about −2° C.

Not only is the solubility of the urea in ammoniacal liquids modified by the addition to the solution of ammonium sulfate or ammonium chloride, but other materials soluble in ammoniacal liquids exert a similar influence upon the solubility of the urea. Thus, at 0° C. a saturated solution of urea in anhydrous liquid ammonia contains about 0.49 parts of urea for every 1 part of ammonia, whereas, if to this urea-ammonia solution potassium nitrate is added, the solubility of the urea is increased so that a solution of urea and potassium nitrate in liquid anhydrous ammonia may be prepared containing 0.59 parts of urea and 0.1 parts of potassium nitrate for every 1 part of ammonia which does not salt out at 0° C. or above. A solution of urea and potassium nitrate in anhydrous liquid ammonia may also be prepared containing 0.77 parts of urea and 0.27 parts of potassium nitrate for every 1 part of ammonia which solution does not salt out at temperatures above about 7° C.

We have further discovered that the solubility of urea in ammoniacal liquids may be modified by dissolving sodium nitrate in the liquid. Thus we have found that whereas solutions of urea in about 50% aqua ammonia (a solution of ammonia in water containing 50% NH₃) saturated at 4.5° C. contain about 1.33 parts of urea for every 1 part of ammonia in the solution, if sodium nitrate is added to such a saturated urea-ammonia-water solution, additional urea may be dissolved so that a solution containing about 1.61 parts of urea 1.61 parts of sodium nitrate for every 1 part of ammonia, which does not salt out at temperatures above 4.5° C. may be prepared. Similarly, whereas a solution of urea in about 50% aqua ammonia saturated at 0° C. contains about 1.17 parts of urea for every 1 part of ammonia, if sodium nitrate is added to the urea-ammonia-water solution, a solution containing 1.33 parts of urea and 0.59 parts of sodium nitrate for every 1 part of ammonia which does not salt out at temperatures above −2° C., may be prepared.

We have found that the same phenomenon holds true for anhydrous liquid ammonia as for aqua ammonia. Thus, at −2° C., a saturated solution of urea in anhydrous liquid ammonia contains about 0.46 parts of urea for every 1 part of ammonia whereas, if to this urea-ammonia solution sodium nitrate is added, the solubility of the urea is increased so that a solution of urea and sodium nitrate in liquid anhydrous ammonia may be prepared containing 1.17 parts of urea and 1.17 parts of sodium nitrate for every 1 part of ammonia which does not salt out at temperatures above −2° C. A solution likewise may be prepared of urea and sodium nitrate in anhydrous liquid ammonia containing 0.72 parts of urea and 0.31 parts of sodium nitrate for every 1 part of ammonia which does not salt out at temperatures above 2° C., and a solution may be prepared containing about 0.55 parts of urea and 1.24 parts of sodium nitrate for every 1 part of anhydrous liquid ammonia which does not salt out at temperatures above 2.6° C.

Not only does the presence of the sodium nitrate increase the solubility of the urea but we have discovered that the converse relationship holds true; i. e., that by dissolving urea in solutions of sodium nitrate in aqua ammonia or liquid anhydrous ammonia, the solubility of the sodium nitrate in the liquid may be increased.

Thus, for example, a solution of sodium nitrate in about 50% aqua ammonia saturated at 4.5° C. contains about 1.21 parts of sodium nitrate for every 1 part of ammonia. As stated above, by dissolving urea in the sodium nitrate-ammonia-water solution a liquid composition containing 1.61 parts of urea and 1.61 parts of sodium nitrate for every 1 part of ammonia which does not salt out at temperatures above 4.5° C. may be prepared. Sodium nitrate is soluble in liquid anhydrous ammonia to the extent of about 1.30 parts of sodium nitrate for every 1 part of liquid anhydrous ammonia at a temperature of 6.7° C. A liquid composition may be prepared, however, containing about 1.37 parts of sodium nitrate and about 0.97 parts of urea for every 1 part of liquid anhydrous ammonia which does not salt out at temperatures above 6.7° C.

A solution of potassium nitrate in anhydrous liquid ammonia saturated at 0° C. contains about 0.1 parts of potassium nitrate for every 1 part of ammonia. If, however, urea is dissolved in this solution of potassium nitrate, the solubility of the potassium nitrate is increased so that a solution in anhydrous liquid ammonia may be prepared containing about 0.46 parts of urea and about 0.24 parts of potassium nitrate for every 1 part of ammonia, which does not salt out at temperatures above about 0° C.

We have likewise discovered that urea and ammonium nitrate exert mutual influences upon the solubility of each other in ammoniacal solutions either in anhydrous liquid ammonia or in aqua ammonia, which phenomena are described in detail in our copending United States application Serial No. 611,232, filed May 13, 1932.

These phenomena discovered by us of the mutual influence of urea and fertilizer salts soluble in ammonia, such as ammonium sulfate, ammonium chloride, sodium and potassium nitrate, and ammonium nitrate upon the solubility of each other in ammoniacal solutions either in anhydrous liquid ammonia or in aqua ammonia are of important practical value since they make available compositions which retain their fluid state at ordinary atmospheric temperatures and contain a high proportion of nitrogen-bearing materials. Furthermore, these solutions do not present serious difficulties due to the separation of solid from the liquid under ordinary conditions. Any solid material which may, under certain circumstances, separate out from the solutions may be redissolved by a slight warming of the solution. These highly concentrated solutions may, therefore, be economically utilized for the transportation of fixed ammonia. They are of practical value in the preparation of fertilizers by addition to acidic materials, for example, to superphosphate. Since they may contain but a relatively small amount of water, they permit the direct production of commercially dry granular fertilizer products by adding the solutions to superphosphate. They permit the production of phosphate fertilizers containing a high proportion of plant food. Since they contain a large proportion of total nitrogen for a given amount of alkaline ammonia, the addition of these solutions to a superphosphate in amount such that the alkaline ammonia does not cause excessive reversion of available $P_2O_5$ in the superphosphate imparts to the resulting fertilizer a high nitrogen content. The fertilizers thus prepared are in excellent physical condition and may contain nitrate-nitrogen, ammonia-nitrogen and urea-nitrogen.

An important characteristic of the solutions of this invention is their lower vapor pressures than the vapor pressures of liquid ammonia or of aqua ammonia of a corresponding concentration. Liquid anhydrous ammonia has vapor pressures which range from 4.2 atmospheres absolute at 0° C. to 11.5 atmospheres absolute at 30° C.

A solution comprising about 45.6 parts of urea, 7.1 parts of ammonium sulfate and 47.3 parts of anhydrous liquid ammonia, which does not salt out at temperatures above about 8° C., has a vapor pressure at 0° C. of about 3.4 atmospheres absolute and at 30° C. of about 9.7 atmospheres absolute. Aqua ammonia containing about 49% NH₃ has a vapor pressure at 0° C. of about 1.1 atmospheres absolute and at 30° C. of about 3.45 atmospheres absolute. A solution of urea and ammonium sulfate in 49% aqua ammonia containing about 40.3% urea and about 15.1% ammonium sulfate, which does not salt out at temperatures above about −3° C., has a vapor pressure at 0° C. of about 0.68 atmospheres absolute and at 30° C. of about 2.35 atmospheres absolute.

A solution of urea and ammonium chloride in anhydrous liquid ammonia containing about 21.9 parts of urea, 40.9 parts of ammonium chloride and 37.2 parts of ammonia has a vapor pressure at 0° C. of about 1.35 atmospheres absolute and at 30° C. of about 4.55 atmospheres absolute. A solution of 44.8 parts of urea and 26.8 parts of ammonium chloride in 28.4 parts of anhydrous liquid ammonia has a vapor pressure of about 1.15 atmospheres absolute at 0° C. and about 3.9 atmospheres absolute at 30° C. Both of these solutions do not salt out at temperatures above about −4° C. A 51% aqua ammonia has a vapor pressure at 0° C., of about 1.2 atmospheres absolute and at 30° C. of about 3.65 atmospheres absolute. A solution of urea and ammonium chloride in 51% aqua ammonia which contains 24.8 parts of urea and 24.8 parts of ammonium chloride in 50.4 parts of 51% aqua ammonia (25.6 parts of ammonia and 24.8 parts of water) has a vapor pressure at 0° C. of 0.46 atmospheres absolute and at 30° C. of 1.74 atmospheres absolute.

A solution of urea and potassium nitrate in anhydrous liquid ammonia containing about 27 parts of urea, about 14.5 parts of potassium nitrate and about 58.5 parts of ammonia has a vapor pressure at 0° C. of about 3.7 atmospheres absolute and at 30° C., a vapor pressure of about 10.1 atmospheres absolute. A solution of potassium nitrate and urea in 50% aqua ammonia containing about 27 parts of urea, 5 parts of potassium nitrate, 34 parts of ammonia and 34 parts of water has a vapor pressure at 0° C. of 0.9 atmospheres absolute and at 30° C. of 2.9 atmospheres absolute.

Solutions of urea and ammonium sulfate, ammonium chloride, sodium nitrate, potassium nitrate, etc. in anhydrous liquid ammonia or aqueous ammoniacal compositions containing these materials, which are substantially saturated with solid components at temperatures between about −30° C. and 30° C., and particularly at about 0° C., are advantageous from the viewpoint of their transportation and use in the treatment of superphosphate for the production of fertilizers due to their relatively low vapor pressures and relatively large amounts of desirable non-basic fertilizer materials contained in the solutions.

The ammoniacal compositions of this invention containing urea and other solid fertilizer material may be readily transported in a transportable package comprising a container and the liquid composition. Due to the material lowering of the vapor pressures of ammoniacal liquids by dissolving therein the foregoing materials, the containers in which the liquids are shipped are not subjected to the relatively high vapor pressures of the ammoniacal liquids themselves. In many cases relatively high vapor pressures of ammoniacal liquids at ordinary atmospheric temperatures which, without the urea and other materials being present, are materially above atmospheric, may be lowered by dissolving in the ammoniacal liquid urea and another solid fertilizer material to such an extent as to permit of its transportation and handling in low pressure containers, whereas an ammoniacal liquid of corresponding composition without these materials dissolved in it would require special equipment for its transportation. Solutions which are substantially saturated with urea at temperatures above about −20° C. are particularly desirable from the viewpoint of the large lowering in vapor pressure of the ammoniacal liquid thus obtained. It is of advantage to dissolve in the ammoniacal liquids having vapor pressures materially above atmospheric pressure at ordinary temperature, the urea and other salt such as ammonium nitrate, ammonium chloride, etc., in amount at least sufficient to lower the vapor pressure of the ammoniacal liquid to about atmospheric at ordinary atmospheric temperatures.

Urea, ammonium sulfate, ammonium chloride, sodium and potassium nitrate, etc., may be prepared for transportation and/or use in the preparation of fertilizers in the form of liquid compositions of this invention by admixing dry solid urea and the other solid fertilizer ingredients of the composition with either liquid or gaseous anhydrous ammonia or with aqua ammonia. Gaseous anhydrous ammonia may be absorbed by the solids to form a liquid product. One of the solids may be added to a solution or slurry of the other in liquid or aqua ammonia. In preparing aqueous compositions, water solutions or slurries containing urea and ammonium sulfate, sodium or potassium nitrate or ammonium chloride may be treated with anhydrous or aqua ammonia or gaseous ammonia may be absorbed in the solution or slurry. In general, the compositions may be prepared by admixing the desired proportions of the urea, ammonia and other solid fertilizer ingredient, with or without water, any one or more of which may contain proportions of the other components.

The following examples are illustrative of methods of preparing the solutions of this invention. The proportions of materials used are given in parts by weight:

*Example I.*—An anhydrous solution comprising ammonium sulfate, urea and ammonia may be prepared as follows: About 6½ parts of ammonium sulfate are mixed with about 94 parts of anhydrous ammonia. At 0° C., for example, not more than about ½ part of the ammonium sulfate would go into solution. About 65 parts of urea are then added to each 100 parts of the ammonium sulfate-ammonia mixture and a solution is formed which does not salt out at temperatures of about 0° C. and above. At 30° C. the solution has a vapor pressure of about 10 atmospheres absolute as compared with a vapor pressure at the same temperature for liquid anhydrous ammonia of 11½ atmospheres.

A similar composition may be prepared by mixing about 65 parts of dry urea with about 94 parts of liquid anhydrous ammonia and about 6½ parts of ammonium sulfate. The urea-liquid anhydrous ammonia mixture would, at 0° C., contain about 28 parts of undissolved $CO(NH_2)_2 \cdot NH_3$. With the ammonium sulfate added a liquid composition which does not salt out at temperatures of about 0° C. and above is formed.

*Example II.*—An aqueous composition may be formed by mixing the following ingredients: (a) about 52½ parts of a urea-water composition containing about 40 parts of urea such as may be obtained from the synthesis of urea from ammonia and carbon dioxide; (b) about 26 parts of a slurry consisting of about 15 parts of ammonium sulfate and about 10½ parts of water such as may be obtained from an ammonium sulfate saturator where sulfuric acid is treated with ammonia; and (c) about 22 parts of anhydrous ammonia.

The above ingredients form a solution which does not salt out at temperatures above about −3° C. It contains about 23 parts of water for every 40 parts of urea, 15 parts of ammonium sulfate and 22 parts of ammonia. At 30° C. the solution has a vapor pressure of about 2.4 atmospheres absolute as contrasted to the vapor pressure of about a 49% aqua ammonia at 30° C. of 3.5 atmospheres absolute.

A solution similar to the above may be prepared by dissolving dry urea and ammonium sulfate in the indicated proportions in about 49% aqua ammonia.

*Example III.*—A fertilizer mixture may be prepared employing the liquid composition described in Example II above by mixing about 180 parts of the liquid with the following materials:

| | Parts about |
|---|---|
| Superphosphate (18% $P_2O_5$) | 890 |
| Cottonseed meal (7% N) | 122 |
| Muriate of potash (containing 50% $K_2O$) | 160 |
| Sand | 648 |

The ammonium sulfate-urea-ammonia liquid may be sprayed upon the other ingredients of the fertilizer while they are being agitated in a rotary mixer. The resulting product is in good physical condition immediately after ammoniation and also after cooling to atmospheric temperature. It contains about 4% N, 8% $P_2O_5$ and 4% $K_2O$.

*Example IV.*—About 86 parts of urea and about 33½ parts of ammonium sulfate are dissolved in about 103 parts of about 39% aqua ammonia. The composition is a liquid at about 20° C. At 30° C. the liquid has a vapor pressure of about 1.2 atmospheres absolute whereas 39% aqua ammonia has a vapor pressure of about 1.9 atmospheres absolute at this temperature.

About 225 parts of the solution are mixed with the following materials:

| | Parts about |
|---|---|
| Superphosphate | 890 |
| Potassium sulfate (50% $K_2O$) | 160 |
| Sand | 725 |

The resulting fertilizer mixture is in good physical condition both immediately after ammoniation and after cooling to atmospheric temperatures. It contains about 4% N, (all of which is derived from the ammoniacal ammonium sulfate liquid), about 8% $P_2O_5$ and 4% $K_2O$.

*Example V.*—A substantially anhydrous liquid composition containing urea, ammonia and ammonium chloride may be prepared as follows: About 56½ parts of dry urea are mixed with about 43½ parts of anhydrous ammonia. These materials at a temperature of about 0° C. would form a slurry containing about 52½ parts of undissolved $CO(NH_2)_2.NH_3$. About 31½ parts of dry ammonium chloride are added to the foregoing urea-ammonia mixture and a liquid composition is formed which does not salt out at 0° C. or above. At 30° C. this liquid has a vapor pressure of about 4.1 atmospheres absolute as compared with the vapor pressure of anhydrous liquid ammonia of 11.5 atmospheres absolute at 30° C.

*Example VI.*—About 52½ parts of dry ammonium chloride are mixed with about 47½ parts of anhydrous ammonia. If cooled below about 8° C. this mixture would completely solidify. Upon thoroughly mixing about 28 parts of dry urea with about 100 parts of the ammonium chloride-ammonia mixture a liquid composition is formed which does not salt out at about −4° C. or above. At 30° C. this liquid composition has a vapor pressure of about 4.6 atmospheres absolute as compared with a vapor pressure of 11.5 atmospheres absolute at 30° C.

*Example VII.*—The following ingredients are mixed: (a) about 52 parts of a urea-water composition containing about 40 parts of urea and 12 parts of water such as may be obtained from a synthesis of urea from ammonia and carbon dioxide; (b) about 68 parts of an ammonium chloride-water composition containing about 40 parts of ammonium chloride such as may be obtained by evaporating an aqueous solution of ammonium chloride; and (c) about 40 parts of anhydrous ammonia. The foregoing ingredients form a solution which does not salt out at about 0° C. or above and which has a vapor pressure at 30° C. of about 1.7 atmospheres absolute. It contains about 40 parts of urea, 40 parts of ammonium chloride, 40 parts of water and about 40 parts of ammonia. This solution corresponds to one which may be prepared by dissolving the indicated proportions of urea and ammonium chloride in a 50% aqua ammonia. The vapor pressure of the foregoing solution of 1.7 atmospheres absolute at 30° C. is materially lower than the vapor pressure of 50% aqua ammonia of about 3.6 atmospheres absolute at 30° C.

The foregoing solution may be utilized for the preparation of a fertilizer by mixing about 160 parts of the solution with the following fertilizer ingredients:

| | Parts about |
|---|---|
| Superphosphate | 890 |
| Ammonium sulfate | 86½ |
| Muriate of potash | 160 |
| Filler (sand) | 700 |

The resulting fertilizer mixture is in good physical condition immediately after ammoniation and also after cooling. It contains about 4% N, 8% $P_2O_5$ and 4% $K_2O$.

*Example VIII.*—About 64½ parts of dry urea and about 39 parts of dry ammonium chloride are dissolved in about 40 parts of liquid anhydrous ammonia forming a solution which does not salt out at temperatures above about −4° C. At 30° C. the vapor pressure of this solution is about 3.9 atmospheres absolute which is approximately the vapor pressure of 52% aqua ammonia at this temperature.

About 145 parts of the foregoing solution are mixed with the following ingredients:

| | Parts about |
|---|---|
| Superphosphate | 890 |
| Ammonium sulfate | 33½ |
| Potassium sulfate | 160 |
| Sand | 775 |

The resulting fertilizer mixture is in good physical condition immediately after mixing the materials and also after cooling the mixture. It contains about 4% N, 8% $P_2O_5$ and 4% $K_2O$.

*Example IX.*—About 10 parts of potassium nitrate and 18½ parts of urea are dissolved in about 40 parts of liquid anhydrous ammonia forming a solution which does not salt out at temperatures above about 3° C. About 68½ parts of the solution are then mixed with the following ingredients:

| | Parts |
|---|---|
| Superphosphate | 890 |
| Ammonium sulfate | 180 |
| Potassium sulfate | 150 |
| Sand | 710 |

The resulting fertilizer product is in good physical condition immediately after ammoniation and also after cooling. It contains about 4% N, 8% $P_2O_5$ and 4% $K_2O$.

*Example X.*—About 50 parts of a urea-water composition containing about 40 parts of urea, such as may be obtained in a process for the synthesis of urea from ammonia and carbon dioxide, are mixed with about 50 parts of sodium nitrate (calculated on the dry basis, although the nitrate may contain adhering mother liquor as it is recovered from solution in a process for its manufacture), about 40 parts of anhydrous liquid ammonia and enough water to bring the total weight of the mixture up to about 170 parts which requires the addition of about 30 parts of water.

The solution of this example may be utilized in the preparation of a fertilizer as follows: About 890 parts of a superphosphate containing 18% $P_2O_5$, 100 parts of ammonium sulfate, 160 parts of muriate of potash (containing the equivalent of 50% $K_2O$) and 680 parts of an inert filler are mixed together. About 170 parts of the foregoing urea-sodium nitrate-ammonia-water composition are then sprayed onto the mixture while it is being agitated in, for example, a rotating drum. The resulting product is in excellent physical condition immediately after ammoniation and also after cooling to atmospheric temperature. The fertilizer thus obtained contains approximately 4% N, 8% $P_2O_5$ and 4% $K_2O$. About 23% of the total nitrogen of the fertilizer comes from the urea, about 10% is nitrate nitrogen and about 67% is ammonium nitrogen.

While the above examples are given as illustrative of this invention, numerous modifications and changes may be made in the particular compositions disclosed and methods of employing them in the production of fertilizers. If desired, the solutions may be prepared combining ammonia and any two or more of the added solid fertilizer materials in an ammoniacal liquid.

When in this specification or in the appended claims reference is made to a solution saturated with the solid components at a given temperature, it is intended to refer to an ammoniacal solution which contains an amount of urea and another fertilizer material soluble in the ammoniacal liquid such that a solid phase containing one or more of the dissolved ingredients does not separate at the given temperature but which, upon cooling to a lower temperature, deposits a solid comprising urea and/or another of the constituents of the solution such as sodium nitrate, potassium nitrate, ammonium chloride, ammonium sulfate or urea, or a complex compound containing two or more ingredients of the solution, particularly compounds of ammonia and one or more of the solid ingredients. Similarly, when reference is made to a liquid saturated with urea it is intended to refer to a solution from which a solid phase containing urea does not separate at the indicated temperatures but which, upon cooling to a lower temperature, deposits a solid comprising urea.

We claim:

1. As a new composition of matter a liquid comprising urea, a fertilizer salt of a strong inorganic acid and a substantial proportion of ammonia, said liquid containing an amount of at least one of said urea and salt dissolved therein in excess of that necessary for saturation of the liquid in the absence of the other.

2. As a new composition of matter a solution of both urea and a fertilizer salt of a strong inorganic acid in an ammoniacal liquor containing a substantial proportion of ammonia, said solution being substantially saturated with at least one of said urea and salt at a temperature between about —30° C. and 30° C.

3. As a new composition of matter a liquid comprising urea, a fertilizer salt from the group consisting of the ammonium, sodium and potassium salts of the strong inorganic acids, and a substantial proportion of ammonia, said liquid containing an amount of at least one of said urea and salt dissolved therein in excess of that necessary for saturation of the liquid in the absence of the other.

4. As a new composition of matter a liquid comprising urea, ammonium sulfate, and a substantial proportion of ammonia, said liquid containing an amount of at least one of said urea and ammonium sulfate dissolved therein in excess of that necessary for saturation of the liquid in the absence of the other.

5. As a new composition of matter a liquid comprising urea, ammonium chloride, and a substantial proportion of ammonia, said liquid containing an amount of at least one of said urea and ammonium chloride dissolved therein in excess of that necessary for saturation of the liquid in the absence of the other.

6. A process for the preparation for transportation of urea, a fertilizer salt of a strong inorganic acid and ammonia which comprises dissolving both the urea and said salt in an ammoniacal liquor containing a substantial proportion of ammonia, said materials being employed in proportions such that the resulting liquid composition contains an amount of at least one of said urea and salt in excess of that necessary for saturation of the ammoniacal liquid in the absence of the other.

7. A process for the preparation for transportation of urea, a fertilizer salt from the group consisting of the ammonium, sodium and potassium salts of the strong inorganic acids, and ammonia which comprises dissolving both the urea and said salt in an ammoniacal liquor containing a substantial proportion of ammonia, said materials being employed in proportions such that the resulting liquid composition contains an amount of at least one of said urea and salt in excess of that necessary for saturation of the ammoniacal liquid in the absence of the other.

8. A process for the preparation for transportation of urea, ammonium sulfate and ammonia which comprises dissolving both the urea and said ammonium sulfate in an ammoniacal liquor containing a substantial proportion of ammonia, said materials being employed in proportions such that the resulting liquid composition contains an amount of at least one of said urea and ammonium sulfate in excess of that necessary for saturation of the ammoniacal liquid in the absence of the other.

9. A process for the preparation for transportation of urea, ammonium chloride, and ammonia which comprises dissolving both the urea and said ammonium chloride in an ammoniacal liquor containing a substantial proportion of ammonia, said materials being employed in proportions such that the resulting liquid composition contains an amount of at least one of said urea and ammonium chloride in excess of that necessary for saturation of the ammoniacal liquid in the absence of the other.

10. A process for producing a fertilizer which comprises treating a solid acidic fertilizer material with a solution of urea and a fertilizer salt of a strong inorganic acid in an ammoniacal liquid containing a substantial proportion of ammonia, said solution containing an amount of at least one of the said fertilizer salt and urea dissolved therein in excess of that necessary for saturation of the ammoniacal liquid in the absence of the other.

11. A process for producing a fertilizer which comprises treating a superphosphate material with a solution of urea and a fertilizer salt of a strong inorganic acid in an ammoniacal liquid containing a substantial proportion of ammonia, said solution containing an amount of at least one of the said fertilizer salt and urea dissolved therein in excess of that necessary for saturation of the ammoniacal liquid in the absence of the other.

12. A process for producing a fertilizer which comprises adding to and mixing with a monocalcium acid phosphate material a solution of both urea and a fertilizer salt of a strong inorganic acid in an ammoniacal liquor containing a substantial proportion of ammonia, said solution prior to addition to said phosphate material being substantially saturated with at least one of said urea and salt at a temperature between about −30° C. and 30° C.

13. A process for producing a fertilizer which comprises treating a solid acidic fertilizer material with a solution of urea and a fertilizer salt from the group consisting of the ammonium, sodium and potassium salts of the strong inorganic acids, in an ammoniacal liquid containing a substantial proportion of ammonia, said solution containing an amount of at least one of the said fertilizer salt and urea dissolved therein in excess of that necessary for saturation of the ammoniacal liquid in the absence of the other.

14. A process for producing a fertilizer which comprises treating a solid acidic fertilizer material with a solution of urea and ammonium sulfate in an ammoniacal liquid containing a substantial proportion of ammonia, said solution containing an amount of at least one of the said ammonium sulfate and urea dissolved therein in excess of that necessary for saturation of the ammoniacal liquid in the absence of the other.

15. A process for producing a fertilizer which comprises treating a superphosphate material with a solution of urea and ammonium sulfate in an ammoniacal liquid containing a substantial proportion of ammonia, said solution containing an amount of at least one of the said ammonium sulfate and urea dissolved therein in excess of that necessary for saturation of the ammoniacal liquid in the absence of the other.

16. A process for producing a fertilizer which comprises treating a solid acidic fertilizer material with a solution of urea and ammonium chloride in an ammoniacal liquid containing a substantial proportion of ammonia, said solution containing an amount of at least one of the said ammonium chloride and urea dissolved therein in excess of that necessary for saturation of the ammoniacal liquid in the absence of the other.

17. A process for producing a fertilizer which comprises treating a superphosphate material with a solution of urea and ammonium chloride in an ammoniacal liquid containing a substantial proportion of ammonia, said solution containing an amount of at least one of the said ammonium chloride and urea dissolved therein in excess of that necessary for saturation of the ammoniacal liquid in the absence of the other.

WALTER H. KNISKERN.
CHARLES K. LAWRENCE.